United States Patent
Weber et al.

(10) Patent No.: US 10,301,459 B2
(45) Date of Patent: May 28, 2019

(54) TIRE WITH RUBBER TREAD CONTAINING A COMBINATION OF STYRENE/BUTADIENE ELASTOMERS AND TRACTION RESINS AND PRE-HYDROPHOBATED PRECIPITATED SILICA REINFORCEMENT

(71) Applicant: The Goodyear Tire & Rubber Company, Akron, OH (US)

(72) Inventors: Renee Marie Weber, Akron, OH (US); Paul Harry Sandstrom, Cuyahoga Falls, OH (US); Matthew James Ritter, Akron, OH (US); Paul Joseph Endres, Brecksville, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 190 days.

(21) Appl. No.: 15/623,417

(22) Filed: Jun. 15, 2017

(65) Prior Publication Data
US 2018/0022904 A1 Jan. 25, 2018

Related U.S. Application Data

(60) Provisional application No. 62/363,974, filed on Jul. 19, 2016.

(51) Int. Cl.
*C08L 9/06* (2006.01)
*B60C 1/00* (2006.01)

(52) U.S. Cl.
CPC .............. *C08L 9/06* (2013.01); *B60C 1/0016* (2013.01); *C08L 2205/025* (2013.01); *C08L 2205/035* (2013.01)

(58) Field of Classification Search
CPC ..... C08L 9/06; C08L 2205/025; B60C 1/0016
USPC .................................................. 523/156, 157
See application file for complete search history.

(56) References Cited

U.S. PATENT DOCUMENTS

| | | | |
|---|---|---|---|
| 5,723,530 A | 3/1998 | Zanzig et al. | |
| 6,221,953 B1 | 4/2001 | Sandstrom et al. | |
| 6,465,560 B1 | 10/2002 | Zanzig et al. | |
| 6,573,324 B1 | 6/2003 | Cohen et al. | |
| 8,459,319 B2 | 6/2013 | Ryba et al. | |
| 8,993,664 B2 | 3/2015 | Miyazaki | |
| 9,657,161 B2 | 5/2017 | Saintigny et al. | |
| 2011/0048599 A1* | 3/2011 | Ryba | B60C 1/0016 152/209.5 |
| 2012/0077902 A1* | 3/2012 | Steiner | B60C 1/0016 523/157 |
| 2012/0214903 A1* | 8/2012 | Masumoto | B60C 1/0016 523/150 |
| 2013/0059965 A1 | 3/2013 | Hirose | |
| 2013/0096248 A1 | 4/2013 | Thompson et al. | |
| 2013/0267640 A1 | 10/2013 | Lopez et al. | |
| 2013/0274404 A1 | 10/2013 | Vasseur et al. | |
| 2013/0289183 A1 | 10/2013 | Kerns et al. | |
| 2013/0296471 A1 | 11/2013 | Lesage et al. | |
| 2014/0135437 A1 | 5/2014 | Sandstrom et al. | |
| 2014/0371346 A1 | 12/2014 | Saintigny et al. | |
| 2015/0283854 A1 | 10/2015 | Saintigny et al. | |
| 2015/0343843 A1 | 12/2015 | Cato et al. | |

FOREIGN PATENT DOCUMENTS

| | | |
|---|---|---|
| EP | 1493597 | 1/2005 |
| EP | 2433812 A1 | 3/2012 |
| JP | 6299022 | 10/1994 |
| JP | 2010275386 | 12/2010 |

OTHER PUBLICATIONS

Korean search report completed Jun. 29, 2018 and received by Jul. 17, 2018.
EPO search report received by Applicant dated Dec. 11, 2017.

* cited by examiner

*Primary Examiner* — Doris L Lee
(74) *Attorney, Agent, or Firm* — John D. DeLong; Henry C. Young

(57) ABSTRACT

The invention relates to a pneumatic tire with a circumferential tread composition which contains a unique combination of styrene/butadiene elastomers, both solution and emulsion prepared, a plurality of traction promoting resins and reinforcing filler which contains a specific combination of a selected carbon black and a pre-hydrophobated precipitated silica.

20 Claims, No Drawings

TIRE WITH RUBBER TREAD CONTAINING A COMBINATION OF STYRENE/BUTADIENE ELASTOMERS AND TRACTION RESINS AND PRE-HYDROPHOBATED PRECIPITATED SILICA REINFORCEMENT

FIELD OF THE INVENTION

This invention relates to a pneumatic tire with a circumferential tread composition which contains a unique combination of styrene/butadiene elastomers, both solution and emulsion prepared, a plurality of traction promoting resins and reinforcing filler network which contains a specific combination of a selected carbon black and a pre-hydrophobated precipitated silica.

BACKGROUND OF THE INVENTION

Ultra high performance pneumatic rubber tires typically contain rubber treads where demands for traction are very unique in that the primary traction requirement is directed to dry traction while still maintaining wet traction. This challenge often presents other issues such as having tread rubber compositions with greater internal heat generation during tire service with associated higher tire running temperature which may result in reduced tire durability. Such increase in internal heat generation is, in general, a promotion of increased hysteresis of the tread rubber composition by the inclusion of the high Tg (high glass transition temperature) elastomers. In some cases, where high Tg elastomers are used for the tread rubber composition to aid in achieving tread traction, use of such high Tg elastomers can create a relative high Tg tread rubber composition which can lead to surface cracking of the tread, including the rubber of the tread grooves.

Further, such tread rubber compositions may contain one or more traction promoting resins to aid in promoting tread traction over a range of tread temperatures.

A significant challenge for such ultra high performance tires is to provide a rubber composition to promote dry traction for the tread while maintaining wet traction through use of high Tg elastomers with attenuation of normally increasing internal heat generation of the tread rubber composition by limiting increased hysteresis of the rubber composition.

While the traction enhancement of the tread rubber composition by the traction resin content may be due to various factors, the melting point, or softening point, of the traction resin, or a combination of traction resins, is normally considered important because, as the resin melts and therefore softens, it undergoes a phase transition and its mechanical properties change.

For this invention, resins with selectively distributed softening points are to be used to better achieve this traction response over a greater operating temperature. A resin with a lower softening point (melting point) may be desirable as the tire is run from a stationary, resting position, to vehicular driving speeds where the temperature of the tread may increase from its stationary ambient temperature (e.g. 23° C.) to a higher operating temperature (e.g. 65° C.).

Therefore, the presence in the tread rubber composition of a resin with a considerably higher melting point would be desirable to promote tread traction at the higher tread temperature associated with the higher vehicular speed and a resin with a lower softening point would be desirable to promote tread traction at a lower tread temperature.

It is apparent that as the resin softens, the cured tread rubber composition containing the softened resin becomes more hysteretic as a result of the softened resin, and therefore predictively more prone to internal heat generation within the rubber composition. This means that, as the tire tread is being run at higher vehicular speeds, the tread rubber composition has a greater tendency to transform internal energy generated within the tread into heat, which results in a significant temperature increase of the rubber composition and a resultant improved traction performance for the tread at higher vehicular speeds.

Representative examples of resins which have heretofore been proposed to promote tire tread traction for tread rubber compositions are, for example, hydrocarbon-derived synthetic resins, coumarone-indene resins, rosin, rosin derivatives, terpene resins and polyester phthalate resins together with a functionalized styrene/butadiene elastomer which are referred to in U.S. Pat. No. 8,459,319.

A significant aspect of this invention is an inventive implementation of a combination of selectively distributed melting point, or softening point, resins together with a plurality of styrene/butadiene elastomers comprised of a combination of styrene/butadiene elastomer as an aqueous emulsion prepared styrene/butadiene rubber (E-SBR) and dual organic solvent solution prepared styrene/butadiene elastomers (S-SBRs).

A further significant aspect of this invention is the employment of pre-hydrophobated precipitated silica (precipitated silica pre-treated to form a pre-hydrophobated precipitated silica prior to addition to the rubber composition) to promote low stiffness (low storage modulus G' property) at low strain (low dynamic elongation) for a tread rubber composition at low tire tread temperatures while substantially maintaining higher tread rubber stiffness (higher storage modulus G' property) at higher tire tread temperatures.

An additional significant aspect of this invention is an employment of a significant content of small particle sized rubber reinforcing carbon black as the reinforcing filler for the tire tread rubber composition.

In one aspect, the selection of the styrene/butadiene elastomers for this invention is provided to promote a resistance to tread rubber cracking under tire load and/or tread deflection at temperatures below about 10° C. while still promoting the desired dry traction for the tread.

The plurality of styrene/butadiene elastomers are comprised of an emulsion polymerization prepared styrene/butadiene elastomer (E-SBR) having a Tg in a range of from about −30° C. to about −50° C. and a bound styrene content in a range of from about 35 to about 45 percent, a solution (organic) polymerization prepared styrene/butadiene elastomer (S-SBR-A) having a Tg in a range of from about −30° C. to about −50° C. and a bound styrene content in a range of from about 35 to about 45 percent and a solution (organic) polymerization prepared styrene/butadiene elastomer (S-SBR-B) having a Tg in a range of from about −3° C. to about −23° C. and a bound styrene in a range of from about 35 to about 45 percent, wherein the Tg's of the elastomers are desirably spaced apart from each other by at least about 4° C., desirably at least about 5° C., where the Tg of the S-SBR-A is spaced apart from the Tg of the S-SBR-B by at least 10° C. and desirably at least 20° C.

In one embodiment, said S-SBR-A has a vinyl content in a range of from about 10 to about 20 percent, said S-SBR-B has a vinyl content of in a range of from about 35 to about 45 percent and said E-SBR has a vinyl content in a range of from about 10 to about 20 percent, based on the butadiene portion of the SBRs.

A significant aspect of the inclusion of the S-SBR-A elastomer is to beneficially promote a lower composite Tg of the styrene/butadiene elastomers, since it has a lower Tg than the S-SBR-B elastomer and where the Tg of S-SBR-A is lower than the combination of the S-SBR-B and E-SBR, and to promote a lower hysteresis of the tread rubber composition to thereby promote a reduced internal heat generation of the tire tread during tire service.

Further, it is considered herein that a significant contribution of the high styrene contents of all of the selected elastomers of at least about 35 percent is envisioned to promote dry traction of the tire tread over ground contact and a broad tire tread operating temperature range.

The carbon black and silica filler reinforcement for the rubber composition is also carefully selected and is comprised of a precipitated silica pre-hydrophobated with at least one of bis(3-triethoxysilylpropyl) polysulfide and alkoxyorganomercaptosilane, desirably an alkoxyorganomercaptosilane and a carbon black of small particle size and high surface area. Such bis(3-triethoxysilylpropyl) polysulfide used to treat the silica may have an average of from about 2 to about 4 connecting sulfur atoms in its polysulfidic bridge.

A further significant aspect of the invention is an employment of at least three, desirably at least four, and optionally, even five, of said resins with the aforesaid combination of S-SBR-A, S-SBR-B and E-SBR styrene/butadiene elastomers together with reinforcing filler comprised of a significant rubber reinforcing carbon black content and said pre-hydrophobated precipitated silica.

A significant contribution of the inclusion of the pre-hydrophobated precipitated silica is envisioned to promote the aforesaid beneficial low stiffness at low dynamic elongation at ambient temperature for the tire tread rubber composition to thereby promote ultimate dry tire acceleration and engaging tire performance at ambient atmospheric temperatures. Also, the inclusion of the pre-hydrophobated precipitated silica is envisioned to promote engaging handling performance of the tire tread during relatively low ambient atmospheric temperatures in a range of from about 5° C. to about 10° C. and damp road conditions.

A significant aspect of the invention is the utilization of such resins selected from resins comprised of polyester phthalate resin having a softening point in a range of from about 20° C. to about 26° C., which is liquid or semi-liquid at about 23° C., styrene/alphamethyl styrene resin having a softening point in a range of from about 80° C. to about 90° C., gum rosin having a softening point in a range of from about 70° C. to about 100° C., desirably about 80° C. to about 90° C., coumarone indene resin having a softening point in a range of from about 90° C. to about 120° C., and alternately also including alkylphenol acetylene resin having a softening point in a range of from about 130° C. to about 150° C.

It is considered that such a unique combination of styrene/butadiene elastomers (S-SBR-A, S-SBR-B and E-SBR) together with the aforesaid combination of resins and pre-hydrophobated silica promotes a tire tread as a departure from past practice with enhanced traction and handling capability over a wide tire tread operating temperature range.

A significant contribution of the combination of resins with spaced apart softening points is considered herein to promote a varied hysteretic property of the rubber composition over a broad temperature range to thereby promote internal dynamic heat generation within the rubber composition to consequently promote traction of the tread on the ground over a wide tire tread operating temperature range.

Historically, it is appreciated that tire treads have heretofore been proposed with various elastomers having selectively distributed Tg's for various purposes such as example, U.S. Pat. Nos. 6,465,560 and 5,723,530. However, this invention is considered herein to be a significant departure from such practice particularly through the use of a combination of the aforesaid E-SBR, S-SBR-A and S-SBR-B elastomers with spaced apart Tg's, together with unique resin and filler reinforcement choices.

In the description of this invention, the terms "rubber compound", "sulfur-cured rubber compound" or "rubber composition", "rubber blend" and "compounded rubber" may be interchangeably used to refer to rubber which has been mixed with rubber compounding ingredients. Such terms are well known to those having skill in such art. The term "phr" is used to refer to parts by weight per 100 parts by weight rubber, as is a conventional practice.

A reference to glass transition temperature of an elastomer, or Tg, as referred to herein, as well as a reference to a resin's melting point, represents an inflection point glass transition temperature of the respective elastomer determined by a differential scanning calorimeter (DSC) at a temperature rate of 10° C. per minute by convention procedure well known to those having skill in such art.

A reference to a resin's softening point as referred to herein relates to its softening point determinable by ASTM E28-58T, sometimes referred to as a "Ring and Ball" softening point.

Disclosure and Practice of Invention

In accordance with this invention, a pneumatic tire is provided having an outer circumferential tread with a tread running surface where said tread is a rubber composition comprised of, based on parts by weight per 100 parts by weight rubber (phr), (A) conjugated diene-based elastomers comprised of:
  (1) about 20 to about 70 phr of a solution polymerization prepared styrene/butadiene elastomer (S-SBR-A) having a styrene content in a range of from about 35 to about 45 percent and a Tg in a range of from about −30° C. to about −50° C., and alternately from about −30° C. to about −40° C.,
  (2) about 20 to about 60 phr of a solution polymerization prepared styrene/butadiene elastomer (S-SBR-B) having a styrene content in a range of from about 35 to about 45 percent and a Tg in a range of from about −3° C. to about −23° C., and alternately from about −10° C. to about −15° C., and
  (3) about 5 to about 30 phr of an aqueous emulsion polymerization prepared styrene/butadiene elastomer (E-SBR) having a styrene content in a range of from about 35 to about 45 percent and a Tg in a range of from about −30° C. to about −50° C., and alternately from about −35° C. to about −45° C., wherein said Tg's of said S-SBR-A, S-SBR-B and E-SBR are spaced apart from each other by at least about 5° C. and wherein the Tg's of said S-SBR-A and S-SBR-B are spaced apart by at least about 10° C., desirably at least about 20° C.; and (B) about 8 to about 30 phr of from about 3 to about 5, alternately 4, traction promoting resins individually present in a range of from about 0.5 to about 15 phr, selected from:

(1) polyester phthalate resin, having a softening point in a range of from about 20° C. to about 26° C.,
(2) styrene/alphamethyl styrene resin, having a softening point in a range of from about 80° C. to about 90° C.,
(3) gum rosin, having a softening point in a range of from about 70° C. to about 100° C., desirably in a range of about 80° C. to about 90° C.,
(4) coumarone indene resin, having a softening point in a range of from about 90° C. to about 120° C., and, alternately
(5) alkylphenol acetylene resin having a softening point in a range of from about 130° C. to about 150° C.;
(C) about 50 to about 130, alternately from 80 about 120, phr of rubber reinforcing filler comprised of rubber reinforcing carbon black having a DBP value in a range of from about 125 to about 150 cc/100 g together with an Iodine value in a range of from about 190 to about 230 g/kg and pre-hydrophobated precipitated silica wherein the weight ratio of said rubber reinforcing carbon black to said pre-hydrophobated precipitated silica is in a range of from about 3.5/1 to about 1.4/1 and wherein said pre-hydrophobated precipitated silica is a precipitated silica treated with at least one of alkoxyorganomercaptosilane and bis(3-trialkoxysilylorgano) polysulfide containing an average of from about 2 to about 4 connecting sulfur atoms in its polysulfidic bridge.

In one embodiment, said S-SBR-A has a vinyl content of from about a range of 10 to about 20 percent, said S-SBR-B has a vinyl content of from about 35 to about 45 percent and said E-SBR has a vinyl content of from about 10 to about 20 percent, based on the butadiene portion of the SBRs.

As indicated, the said rubber reinforcing carbon black has a DBP (dibutyl phthalate) absorption value (ASTM D 2414) of from about 125 to about 150 cc/100 g in combination with an Iodine value (ASTM D1510) in a range of from about 190 to about 230 g/kg. The high iodine value for the rubber reinforcing carbon black is indicative of a relatively small particle size whereas the high DBP value is indicative of a high structure for the carbon black. Representative of such rubber reinforcing carbon black, for example, according to its ASTM designation, is N191.

It is generally desired that at least four of the five resins be present. The amount of each prescribed resin, as heretofore indicated, is desirably at least 1.5 phr, and alternately at least 5 phr, which may be in a range, for example, of from about 0.5 to about 15 phr where the total of such resins is in a range, for example, of from about 8 to about 30 phr in the rubber composition in order that the resins may reasonably affect the hysteresis of the rubber composition as evidenced by its tan delta viscoelastic property in a 30° C. to 150° C. temperature range and therefore contribute to the tread rubber hysteresis and the tread traction.

A desirable combination of such four resins may be, for example:
(A) polyester phthalate resin, (which is considered to be a liquid, or semi-liquid at a room temperature of about 23° C.),
(B) styrene/alphamethylstyrene resin having a softening point in a range of from about 80° C. to about 90° C., and
(C) gum rosin, having a softening point in a range of from about 70° C. to about 100° C., desirably from about 80° C. to about 90° C.,
(D) coumarone indene resin, having a softening point in a range of from about 90° C. to about 120° C.

Alternately, a desirable combination of five resins may be:
(A) polyester phthalate resin, (which is considered to be a liquid, or semi-liquid at a room temperature of about 23° C.),
(B) styrene/alphamethylstyrene resin having a softening point in a range of from about 80° C. to about 90° C.,
(C) gum rosin, having a softening point in a range of from about 70° C. to about 100° C., desirably from about 80° C. to about 90° C.,
(D) coumarone indene resin, having a softening point in a range of from about 90° C. to about 120° C., and
(E) alkylphenol acetylene resin having a softening point in a range of from about 130° C. to about 150° C.

By tread traction it is meant contribution of the tread to resistance to skidding on a road surface as well as contribution of the tread to tire handling, grip and cornering performance.

The synthetic, amorphous silica (e.g. rubber reinforcing precipitated silica) for the pre-hydrophobated precipitated silica, may, in general, be prepared by a controlled acidification of a soluble silicate, e.g. sodium silicate. Such precipitated silicas used for reinforcement of rubber are well known to those having skill in such art.

Such precipitated silicas might have, for example, a BET surface area, as measured using nitrogen gas, in a range, for example, of about 40 to about 600, and more usually in a range of about 50 to about 300, square meters per gram. A BET method of measuring surface area is described, for example, in the *Journal of the American Chemical Society*, Volume 60, understood to include Page 308 in the year 1938.

The precipitated silica may also have, for example, a dibutylphthalate (DBP) absorption value in a range of about 100 to about 350, and more usually about 150 to about 300 cc/100 gm.

An exemplary pre-hydrophobated precipitated silica is considered to be, although not intended to be limiting, Agilon™ 400 and Agilon™ 454 from PPG Industries.

In one embodiment said pre-hydrophobated precipitated silica is a precipitated silica treated with an alkoxyorganomercaptosilane.

In one embodiment, said pre-hydrophobated precipitated silica is a precipitated silica treated with a bis(3-triethoxysilylpropyl) polysulfide containing an average from about 2 to about 4 connecting sulfur atoms in its polysulfidic bridge.

In one embodiment, the tread rubber composition further contains a silica coupler comprised of a bis (3-triethoxysilylpropyl) polysulfide containing an average from about 2 to about 4 connecting sulfur atoms in its polysulfidic bridge.

In one embodiment, the tread rubber composition also contains a precipitated silica which is not pre-hydrophobated prior to its addition to the tread rubber composition.

It should readily be understood by one having skill in the art that the rubber composition of the tire tread may be compounded by methods generally known in the rubber compounding art, such as mixing the various sulfur-vulcanizable constituent rubbers with various additive materials such as, for example, curing aids, such as sulfur, activators, retarders and accelerators, processing additives, such as oils or liquid polymers, the aforesaid plurality of resins, precipitated silica with coupling agent and rubber reinforcing carbon black reinforcing fillers, and plasticizers, fillers, pigments, stearic acid, zinc oxide, waxes, antioxidants and antiozonants, and peptizing agents, where appropriate.

The sulfur vulcanization of the rubber composition is conducted in the presence of a sulfur-vulcanizing agent. Examples of suitable sulfur-vulcanizing agents may include, as may be appropriate, elemental sulfur (free sulfur) or sulfur-donating vulcanizing agents, for example, an amine disulfide, polymeric polysulfide or sulfur olefin adducts. Usually, the sulfur-vulcanizing agent is likely to be elemental sulfur. As known to those skilled in the art, sulfur-vulcanizing agents may be used, where appropriate, in an amount, for example, ranging from about 0.5 to about 8 phr, alternately in a range from about 1.5 to about 2.25 phr.

Sulfur vulcanization accelerators and retarders, where appropriate, are typically used to control the time and/or temperature required for vulcanization and to improve the properties of the vulcanizate. For example, in one embodiment, a single accelerator system may be used, i.e., primary accelerator. Conventionally, a primary accelerator where used, is used, for example, in amounts ranging from about 0.5 to about 2 phr. In another embodiment, combinations of two or more accelerators in which a primary accelerator may be used, where appropriate, generally in the larger amounts (0.5 to 1 phr), with a secondary accelerator, generally in smaller amounts (0.05 to 0.5 phr) in order to activate and to improve the properties of the vulcanizate. Combinations of such accelerators have historically been observed to produce a synergistic effect of the final properties of sulfur-cured rubbers and are often somewhat better than those produced by use of either accelerator alone. In addition, delayed action accelerators may be used, where appropriate, which are usually less affected by normal processing temperatures but produce satisfactory cures at ordinary vulcanization temperatures. Representative examples of accelerators may include, for example and where appropriate, amines, disulfides, guanidines, thioureas, thiazoles, thiurams, sulfenamides, dithiocarbamates and xanthates. Often, the primary accelerator may be a sulfenamide. If a second accelerator is used, the secondary accelerator may be, for example, a guanidine, dithiocarbamate or thiuram compound.

The tire can be built, shaped, molded and cured by various methods which will be readily apparent to those having skill in the art.

As indicated, a challenge is to provide the tread rubber composition with a combination of properties to promote wet tread traction without sacrificing dry traction and without excessively promoting internal heat generation (with excessively promoting rubber hysteresis) during tire service where the challenge is approached with a combination of emulsion polymerization formed styrene/butadiene rubber (E-SBR) and solution polymerization formed styrene styrene/butadiene rubber (S-SBR-A and S-SBR-B) together with a combination of traction resins.

Representative of desired target physical properties and their influence on cured tire performance of such tread rubber composition are illustrated in the following Table A:

TABLE A

| Rubber Property | Target Properties |
| --- | --- |
| Wet traction, tan delta (tangent delta) at 0° C. | above 0.35 |
| Dry traction, storage modulus G' at 100° C., 1% strain | below 4 MPa, desirably below 3 MPa |
| Hysteresis (heat build-up), rebound, hot (100° C.) | greater than 40 |
| Tread cracking, brittle point | below −15° C. |

The practice of this invention is further illustrated by reference to the following examples which are intended to be representative rather than restrictive of the scope of the invention. Unless otherwise indicated, all parts and percentages are by weight.

EXAMPLE I

Rubber compositions were prepared for evaluating rubber compositions with combinations of elastomers and traction promoting resins together with filler reinforcement including pre-hydrophobated precipitated silica reinforcing filler. The overall composition formulations are summarized in Table 1 for their preparation with four sequential separate non-productive (NP1 through NP4) mixing stages (steps) in an internal rubber mixer followed by a productive (PR) mixing stage (step) where sulfur and sulfur vulcanization accelerators are added.

TABLE 1

| | Parts (rounded) | |
| --- | --- | --- |
| | Control Cmpd A | Exp. Cmpd B |
| Non-productive sequential mixing steps (NP1-4) to about 160° C. | | |
| E-SBR rubber[1] with Tg of about −40° C. | 0 | 10 |
| S-SBR-A[2] rubber with Tg of about −34° C. | 50 | 65 |
| S-SBR-B[3] rubber with Tg of about −13° C. | 50 | 25 |
| Precipitated silica[4] | 25 | 0 |
| Silica coupling agent[5] | 2 | 0 |
| Pre-hydrophobated silica[6] | 0 | 30 |
| Carbon black[7] | 77 | 67 |
| Rubber processing oil, wax and processing aid[8] | 4 | 4 |
| Zinc oxide and fatty acid[9] | 5 | 5 |
| Antidegradants | 5 | 5 |
| Resins and approximate softening points | | |
| Resin A: polyester phthalate resin, about 23° C.[10-A] | 5 | 5 |
| Resin B: styrene/alphamethylstyrene resin, about 85° C.[10-B] | 1 | 3.5 |
| Resin C: gum rosin acid resin, about 85° C.[10-C] | 5 | 3 |
| Resin D: coumarone indene resin, about 105° C.[10-D] | 1 | 2 |
| Productive Mixing Step (PR) to about 110° C. | | |
| Sulfur | 2 | 2 |
| Accelerators[11] | 3 | 3 |

[1]Emulsion polymerization prepared styrene/butadiene elastomer having a Tg of about −40° C. and containing about 40 percent bound styrene from the Trinseo Company; an oil extended elastomer containing 37.5 parts by weight of rubber processing oil per 100 parts by weight of the elastomer and reported in the Table in terms of parts by weight of the elastomer

[2]Solution polymerization prepared styrene/butadiene elastomer (referred to herein as SBR-A) having a Tg of about −34° C. and containing about 40 percent bound styrene as SE SLR4630 ™ from the Trinseo Company; an oil extended elastomer oil containing 37.5 parts by weight of rubber processing oil per 100 parts by weight of the elastomer and reported in the Table in terms of parts by weight of the elastomer

[3]Solution polymerization prepared styrene/butadiene elastomer (referred to herein as S-SBR-B) having a Tg of about −13° C. and containing about 40 percent bound styrene as SE6233 ™ from the Sumitomo Chemical Company; the elastomer being oil extended by containing 37.5 parts by weight of rubber processing oil per 100 parts by weight of the elastomer and reported in the Table in terms of parts by weight of the elastomer

[4]Precipitated silica as Zeosil ™ 1165 MP from Solvay

[5]Silica coupling agent as a composite of Si266 ™ coupling agent on carbon black in a 50/50 weight ratio thereof from Evonic, comprised of bis(3-triethoxysilylpropyl) polysulfide containing a range of from about 2.2 to about 2.6 sulfur atoms in its polysulfidic bridge and reported in the Table as the composite for the Control and as a liquid without carbon black carrier for the Experimental rubber composition

[6]Pre-hydropohobated precipitated silica as Agilon ™ 400 from PPG Industries

[7]Rubber reinforcing carbon black as N191, an ASTM designation, having a reported DBP absorption value (ASTM D 2414) of about 134 cc/100 g and an Iodine value (ASTM D1510) of about 202 g/kg

[8]Rubber processing oil, microcrystalline and paraffinic wax and 2 phr of processing aid as WB16 from Struktol

[9]Fatty acid comprised of stearic, palmitic and oleic acids

[10-A]Resin A, a polyester terephthalate resin having a reported melting point of about 23° C., as Plasthall P-900 ™ from Hallstar

[10-B]Resin B, a styrene/alpha methylstyrene resin having a reported melting point of about 85° C., as Impera 1504 ™ from Eastman Chemical

[10-C]Resin C, a gum rosin acid resin having a melting point of about 85° C.

[10-D]Resin D, a coumarone indene resin having a reported softening point of about 105° C., as Novares C100 ™ from Ruetgers.

[11]Sulfur cure accelerators as sulfenamide and diphenylguanidine

The blend is prepared by first mixing in a sequential series of 4 non-productive (NP) mixing steps in an internal rubber mixer followed by mixing the mixture in a productive mixing step (PR) in which curatives are added.

The prepared rubber Samples of Example I were cured at a temperature of about 160° C. for about 14 minutes and various physical properties reported in Table 2.

TABLE 2

|  | Control Cmpd A | Exp Cmpd B | Target Properties |
|---|---|---|---|
| Resins (phr) and approximate Softening Points (° C.) | | | |
| Resin A: polyester terephthalate resin, liquid at 23° C. | 5 | 5 | — |
| Resin B: styrene/alphamethylstyrene resin, 85° C. | 1 | 3.5 | — |
| Resin C: gum rosin acid resin, 85° C. | 5 | 3 | — |
| Resin D: coumarone indene resin, 105° C. | 1 | 2 | — |
| Elastomers (phr) and approximate Tg (° C.) | | | |
| E-SBR (Tg = −40° C.) | 0 | 10 | — |
| S-SBR A (Tg = −34° C.) | 50 | 65 | — |
| S-SBR B (Tg = −13° C.) | 50 | 25 | — |
| Reinforcing Filler (phr) | | | |
| Precipitated silica | 25 | 0 | — |
| Silica coupling agent | 2 | 0 | — |
| Pre-hydrophobated precipitated silica | 0 | 30 | — |
| Carbon black (N191) | 77 | 67 | — |
| Tread Rubber Composition, Dry Traction Promotion Properties | | | |
| Storage modulus (G'), 100° C., 1 Hertz, 1% strain (MPa), lower is better | 4.77 | 2.27 | <4 |
| Tread Rubber Composition, Wet, Damp Traction Promotion Properties | | | |
| Tan delta at 0° C., 0.1% strain and 11 Hertz (higher is better) | 0.41 | 0.38 | >0.35 |
| Tread Rubber Hysteresis Reduction Promotion Properties | | | |
| Hot rebound (100° C.) (higher is better) | 36.6 | 50.5 | >40 |
| Tread Rubber Composition Predictive Cracking Resistance | | | |
| Brittle point, ° C. (lower brittle point temperatures are better) | −11° C. | −18° C. | <−15° C. |

For the tan delta property at 0° C., samples of the cured rubber blends were tested by a Rheometrics RSA III analytical instrument. An objective was to measure and report in the Table the viscoelastic response to an applied deformation of a cured rubber sample under tension at a specified very low strain, namely at a 0.1 percent strain, and at a low temperature of 0° C. The tan delta is a measure of a compound's viscoelastic character which has been observed to relate to tire tread performance.

The storage modulus (G') measured by Rubber Process Analyzer, RPA 3300.

From Table 2 it is seen that:

(A) The experimental compound B met all of the target lab predictive properties for the prediction of dry traction, wet traction, hysteresis and cracking resistance of the tread surface. In contrast the control compound met only the target lab predictive property for wet traction.

(B) The novel blend of specific elastomers, fillers and resins used in the experimental compound allowed the objective for tire performance to be met for such a tread composition for ultra high performance tires.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire is provided having an outer circumferential tread with a tread running surface where said tread is a rubber composition comprised of, based on parts by weight per 100 parts by weight rubber (phr),
   (A) conjugated diene-based elastomers comprised of:
      (1) about 20 to about 70 phr of a solution polymerization prepared styrene/butadiene elastomer (S-SBR-A) having a styrene content in a range of from about 35 to about 45 percent and a Tg in a range of from about −30° C. to about −50° C.,
      (2) about 20 to about 60 phr of a solution polymerization prepared styrene/butadiene elastomer (S-SBR-B) having a styrene content in a range of from about 35 to about 45 percent and a Tg in a range of from about −3° C. to about −23° C., and
      (3) about 5 to about 30 phr of an aqueous emulsion polymerization prepared styrene/butadiene elastomer (E-SBR) having a styrene content in a range of from about 35 to about 45 percent and a Tg in a range of from about −30° C. to about −50° C., wherein said Tg's of said S-SBR-A, S-SBR-B and E-SBR are spaced apart from each other by at least about 4° C.;
   (B) about 8 to about 30 phr of from about 3 to about 5 traction promoting resins individually present in a range of from about 0.5 to about 15 phr, selected from:
      (1) polyester phthalate resin, having a softening point in a range of from about 20° C. to about 26° C.,
      (2) styrene/alphamethyl styrene resin, having a softening point in a range of from about 80° C. to about 90° C.,
      (3) gum rosin, having a softening point in a range of from about 70° C. to about 100° C., desirably about 80° C. to about 90° C.,
      (4) coumarone indene resin, having a softening point in a range of from about 90° C. to about 120° C., and alternately
      (5) alkylphenol acetylene resin having a softening point in a range of from about 130° C. to about 150° C.;
   (C) about 50 to about 130 phr of rubber reinforcing filler comprised of rubber reinforcing carbon black and pre-hydrophobated precipitated silica containing from about 40 to about 100 phr of said rubber reinforcing carbon back, wherein the weight ratio of said rubber reinforcing carbon black to said precipitated silica is at least about 70/30, wherein said pre-hydrophobated precipitated silica is a precipitated silica treated with at least one of alkoxyorganomercaptosilane and bis(3-trialkoxysilylorgano) polysulfide containing an average of from about 2 to about 4 connecting sulfur atoms in its polysulfidic bridge.

2. The tire of claim 1 wherein said Tg's of said S-SBR-A and S-SBR-B are spaced apart from each other by at least about 10° C.

3. The tire of claim 1 wherein said S-SBR-A has a vinyl content in a range of from about 10 to about 20 percent, said S-SBR-B has a vinyl content in a range of from about 35 to about 45 percent and said E-SBR has a vinyl content in a range of from about 10 to about 20 percent, based on the butadiene portion of the SBRs.

4. The tire of claim 1 wherein said traction resins are comprised of said polyester phthalate resin, styrene/alphamethyl styrene resin, gum rosin and coumarone indene resin.

5. The tire of claim 4 where said traction resins further comprise said alkylphenol acetylene resin.

6. The tire of claim 1 wherein said rubber reinforcing carbon black has a DBP (dibutyl phthalate) absorption value (ASTM D 2414) of from about 125 to about 150 cc/100 g in combination with an Iodine value (ASTM D1510) in a range of from about 190 to about 230 g/kg.

7. The tire of claim 1 wherein said pre-hydrophobated precipitated silica is a precipitated silica treated with an alkoxyorganomercaptosilane.

8. The tire of claim 1 wherein said pre-hydrophobated precipitated silica is a precipitated silica treated with a bis(3-triethoxysilylpropyl) polysulfide containing an average from about 2 to about 4 connecting sulfur atoms in its polysulfidic bridge.

9. The tire of claim 1 wherein said tread rubber composition further contains a silica coupler comprised of a bis(3-triethoxysilylpropyl) polysulfide containing an average from about 2 to about 4 connecting sulfur atoms in its polysulfidic bridge.

10. The tire of claim 1 where said tread rubber composition further contains precipitated silica which is not a pre-hydrophobated precipitated silica.

11. The tire of claim 10 wherein said tread rubber composition further contains a silica coupler comprised of a bis(3-triethoxysilylpropyl) polysulfide containing an average from about 2 to about 4 connecting sulfur atoms in its polysulfidic bridge.

12. The tire of claim 1 where, for said tread rubber composition:
    (A) said traction resins are comprised of said polyester phthalate resin, styrene/alphamethyl styrene resin, gum rosin and coumarone indene resin,
    (B) said rubber reinforcing carbon black has a DBP (dibutyl phthalate) absorption value (ASTM D 2414) of from about 125 to about 150 cc/100 g in combination with an Iodine value (ASTM D1510) in a range of from about 190 to about 230 g/kg, and
    (C) said pre-hydrophobated precipitated silica is a precipitated silica treated with an alkoxyorganomercaptosilane.

13. The tire of claim 12 wherein said traction resins further comprise said alkylphenol acetylene resin.

14. The tire of claim 12 wherein said Tg's of said S-SBR-A and S-SBR-B are spaced apart from each other by at least about 10° C.

15. The tire of claim 1 where, for said tread rubber composition:
    (A) said traction resins are comprised of said polyester phthalate resin, styrene/alphamethyl styrene resin, gum rosin and coumarone indene resin,
    (B) said rubber reinforcing carbon black has a DBP (dibutyl phthalate) absorption value (ASTM D 2414) of from about 125 to about 150 cc/100 g in combination with an Iodine value (ASTM D1510) in a range of from about 190 to about 230 g/kg,
    (C) said pre-hydrophobated precipitated silica is a precipitated silica treated with an alkoxyorganomercaptosilane, and
    (D) said rubber composition further contains a silica coupler comprised of a bis(3-triethoxysilylpropyl) polysulfide containing an average from about 2 to about 4 connecting sulfur atoms in its polysulfidic bridge.

16. The tire of claim 15 wherein said traction resins further comprise said alkylphenol acetylene resin.

17. The tire of claim 1 where, for said tread rubber composition:
    (A) said traction resins are comprised of said polyester phthalate resin, styrene/alphamethyl styrene resin, gum rosin and coumarone indene resin,
    (B) said rubber reinforcing carbon black has a DBP (dibutyl phthalate) absorption value (ASTM D 2414) of from about 125 to about 150 cc/100 g in combination with an Iodine value (ASTM D1510) in a range of from about 190 to about 230 g/kg,
    (C) said pre-hydrophobated precipitated silica is a precipitated silica treated with an alkoxyorganomercaptosilane, and
    (D) said rubber composition further contains precipitated silica which is not a pre-hydrophobated precipitated silica.

18. The tire of claim 17 wherein said traction resins further comprise said alkylphenol acetylene resin.

19. The tire of claim 1 where, for said tread rubber composition:
    (A) said traction resins are comprised of said polyester phthalate resin, styrene/alphamethyl styrene resin, gum rosin and coumarone indene resin,
    (B) said rubber reinforcing carbon black has a DBP (dibutyl phthalate) absorption value (ASTM D 2414) of from about 125 to about 150 cc/100 g in combination with an Iodine value (ASTM D1510) in a range of from about 190 to about 230 g/kg,
    (C) said pre-hydrophobated precipitated silica is a precipitated silica treated with an alkoxyorganomercaptosilane,
    (D) said rubber composition further contains a silica coupler comprised of a bis(3-triethoxysilylpropyl) polysulfide containing an average from about 2 to about 4 connecting sulfur atoms in its polysulfidic bridge, and
    (E) said rubber composition further contains precipitated silica which is not a pre-hydrophobated precipitated silica.

20. The tire of claim 19 wherein said traction resins further comprise said alkylphenol acetylene resin.

* * * * *